March 4, 1969    J. H. VARTERASIAN ET AL    3,431,498
RADIO VOLUME CONTROL PROPORTIONAL TO SPEED
Filed Dec. 29, 1965

INVENTORS
John H. Varterasian,
& C. Harold Ek

Robert E. Fowler
ATTORNEY

United States Patent Office 3,431,498
Patented Mar. 4, 1969

3,431,498
RADIO VOLUME CONTROL PROPORTIONAL TO SPEED
John H. Varterasian, Livonia, and C. Harold Ek, Troy, Mich., assignors to General Motors Corporation, Detroit, Mich., a corporation of Delaware
Filed Dec. 29, 1965, Ser. No. 517,407
U.S. Cl. 325—406                    7 Claims
Int. Cl. H04b *1/06, 1/16*

ABSTRACT OF THE DISCLOSURE

This invention relates to a control system for automatically adjusting the volume of an automobile radio receiver in proportion to the speed of the vehicle upon which it is mounted through the use of temperature sensitive resistance means connected in circuit with the loudspeaker and mounted in position to have air flow thereover proportional to car speed.

State of the prior art

Prior patents have shown generally means of changing the volume of a radio receiving set mounted in a moving vehicle. See Wolff, 2,080,554, or Riddle, 2,159,052. However, both of these control systems utilize variable resistance means which is mechanically controlled either by the accelerator linkage or by a biased air vane positioned by vehicle movement. Smith, 2,080,581, also discloses a volume control system for a radio receiver mounted in an automobile in which a wind driven A.C. generator is used to provide a control voltage for the volume. It is to be noted that all of this art is quite old, the most recent having issued in 1939 and as far as applicants are aware the patented structures were not used commercially. Yet the problem of automatically controlling the volume of a radio receiver proportional to car speed is even more important at the present since more cars are equipped with receivers and cars operate at higher speeds.

Description of the invention

The present invention has the advantage that it does not use any moving parts and is easy to install on either new or older vehicles. It is small, rugged and unaffected by shock or vibration.

The present invention is illustrated in the associated drawings in which.

Basically the invention relates to a thermistor device which is connected in a shunt circuit to the speaker of an automotive radio receiver to vary the voltage across the speaker from the audio amplifier. As the temperature of a thermistor changes the resistivity of the same changes and thus the amount of current flow through the shunt circuit will change to vary the loudspeaker voltage. In order to cause the variations in car speed to change the temperature of the thermistor in the largest proportionate amount the invention proposes to mount the thermistor in such a manner that air flow is directed to the thermistor and flows thereover. A localized heating coil is also provided to cause the temperature of the thermistor to be relatively high when the car is stationary and/or moving at slow speed so that air directed thereover will cause the temperature to be reduced over a considerable range as the car speed increases.

Figure 1:
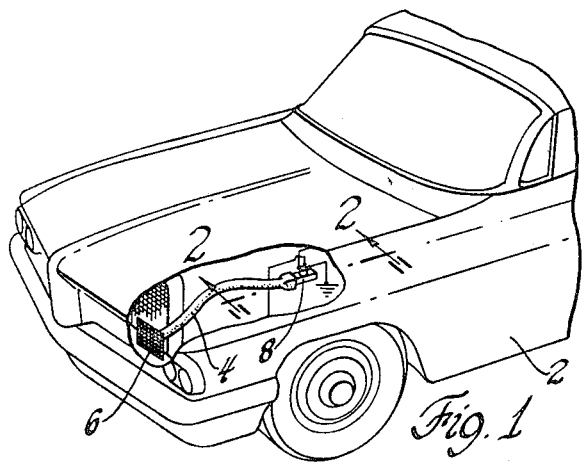
FIGURE 1 is a perspective view of an automotive vehicle with parts broken away to show the invention installed.

Referring now more particularly to the drawings, FIG. 1 shows an automotive vehicle 2 having mounted under its hood thereof a long plastic tube 4 lying substantially along the longitudinal axis of the vehicle. The forward end of the tube terminates just in front of the radiator and is covered by a mesh screen 6 to prevent any sizable objects from entering the tube. The rear end of the tube slips over the forward end of the support and convector tube 8 in which the control thermistors are mounted and these are connected into the audio amplifier and loudspeaker circuit.

Figure 2:
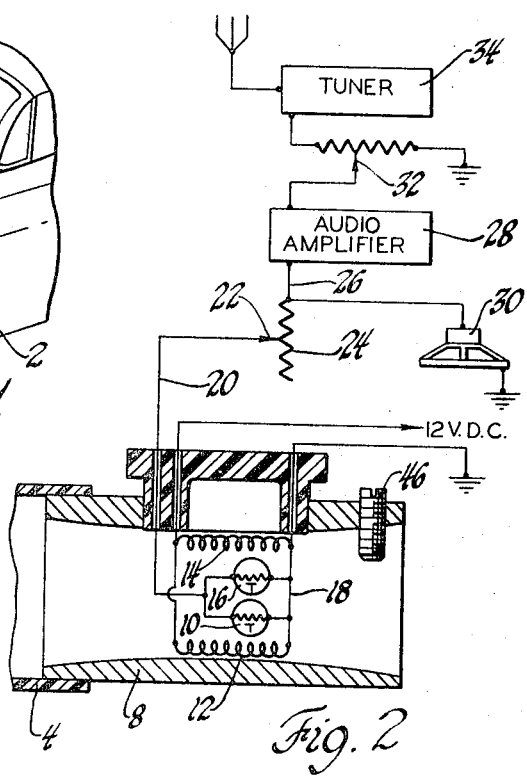
FIG. 2 is an enlarged section through the control element together with a block and circuit diagram of the control system for the loudspeaker.

FIG. 2 is an enlarged section taken on the line 2—2 of FIG. 1 and shows the mounting tube 8 to which the rear end of the tube 4 is connected. A thermistor 10 is supported in the channel and centrally mounted within a heating coil consisting of two parts 12 and 14 connected in parallel across a 12 volt D.C. circuit supplied from the vehicle battery. While the system will operate with only a single thermistor as a control element it has been found that two thermistors in parallel operated somewhat more satisfactorily for the reason that one thermistor did not cool sufficiently fast in the moving vehicle due to heat caused by current flow therein. When two thermistors are connected in parallel, of course, the resultant resistance is cut in half and lowered. FIG. 2, therefore, shows the more preferred form and illustrates a second thermistor 16 connected in parallel with the first, 10. These two thermistors have one terminal connected to power line 18 which is grounded and the other side connected to input line 20 which extends to adjustable tap 22 movable over resistor 24. Resistance 24 has one unconnected terminal and the other connected to line 26 which extends between audio amplifier 28 and loudspeaker coil 30, the opposite terminal of which is grounded. The audio amplifier is, of course, fed by signal voltage from the volume control 32 which in turn is fed from the tuner 34. In the rear portion of the support 8 there is inserted an adjustable set screw 46. This is provided for mechanical calibration. The position of this set screw determines the amount of air flow through the supporting tube 8. The further it is driven into the passage the more air it blocks off. With more air flow, volume changes occur at lower speeds, with less it is necessary to go to higher speed before the volume change is the same. The transducer formed of the thermistors and their heated housing must be mounted far enough away from the radiator to prevent heat from the engine and radiator from affecting it to too great an extent.

Figure 3:
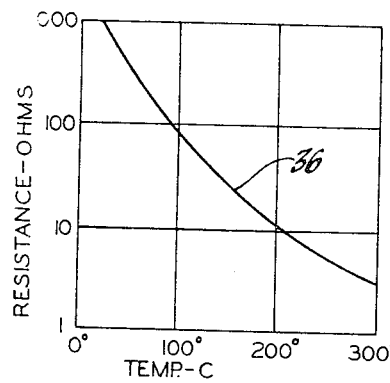
FIG. 3 is a graph illustrating the variation in resistance over a given temperature range of the control element; and, FIG. 4 is a graph showing the change in voltage on the speaker with car speed to illustrate the differences between increasing and decreasing vehicle speed.

FIG. 3 illustrates the change in resistance with temperature variation in a conventional thermistor. The graph 36 shows that at high temperatures, such as perhaps 200° C. the resistance of the thermistor would be substantially 10 ohms, a condition which would exist if the device was in operation and the vehicle substantially motionless. The heater coil would heat the thermistor up and no air would be conducted in through tube 4 to cool it. As the vehicle gathered speed, air would be blown in through said conductive tube tending to cool the thermistor, and assuming that the speed of the vehicle was sufficient to cool it to 100° C. the resistance would have increased tenfold to 100 ohms, or as further increases in speed were made perhaps approaching 1,000 ohms. Thus more and more voltage would be applied to the speaker and the signal would increase in proportion. As was earlier mentioned it becomes more difficult to reduce the resistance of a single transistor far enough at the low temperature end and by connecting two resistances in parallel the problem was simplified.

Figure 4:
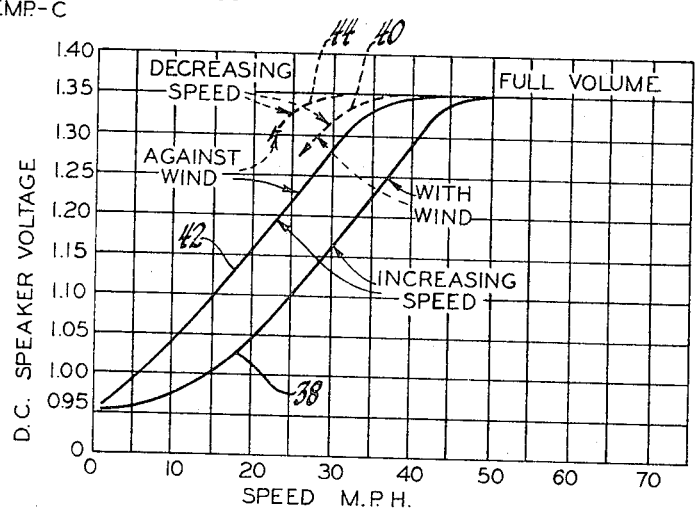

FIG. 4 shows the results of tests performed on a vehicle equipped with the present invention. In that case the D.C. speaker voltage is plotted as the ordinate and the speed of the vehicle as the abscissa. This illustrates that starting from a standstill and increasing vehicle speed with the wind in the ambient area the lower curve 38 is obtained until full volume is reached at 50 miles an hour, whereas when the vehicle is slowed down and still proceeding in the same direction the same curve is not retraced but hysteresis is noted and in slowing down the upper dotted line curve as shown at 40 is obtained. When driving against the wind a different set of curves is obtained. In increasing from zero, curve 42 shows the change up to full volume at 40 miles an hour and then beginning to drop off on a still further delayed hysteresis curve 44.

By using the current invention it will be obvious that a very smooth control can be obtained to gradually increase the volume as the car speed increases, and decrease the volume with decreasing car speed with no moving parts and with substantially no service problems involved.

What is claimed is:

1. In radio receiving means having a speaker which is mounted on a mobile vehicle whose speed changes which causes the ambient noise level to increase and decrease with increase and decrease of the speed of the vehicle, the improvement which comprises automatic means for varying the volume of the sound emanating from the speaker proportionally with changes of speed of the vehicle including a resistance means connected in circuit with the speaker which varies in value with changes in temperature, said variation producing variations in the output of the speaker, a tubular mounting means in said vehicle inside of which said resistance means is mounted, the axis of said tubular mounting means being substantially parallel to the longitudinal axis of the vehicle so that air will be conveyed through the same and over the resistance as the vehicle moves to cool it, the cooling effect being proportional to the speed of the air therethrough which is in turn proportional to vehicle speed to adjust the speaker volume.

2. Automatic volume control means for radio receiving apparatus mounted in mobile vehicles as defined in claim 1 having heating means in said tubular mounting means adjacent the resistance means to maintain a given initial temperature.

3. Automatic volume control means for radio receiving apparatus mounted in mobile vehicles as defined in claim 1 in which the resistance means consists of a thermistor.

4. Automatic volume control means for radio receiving apparatus mounted in mobile vehicles as defined in claim 1 in which the resistance means consists of a plurality of thermistor units connected in parallel in the circuit.

5. Automatic volume control means for radio receiving apparatus mounted in mobile vehicles as defined in claim 1 in which means are provided in the tubular mounting means to vary the flow therethrough.

6. Automatic volume control means for radio receiving apparatus mounted in mobile vehicles as defined in claim 5 in which said means to vary the flow consists of a member which projects into the tubular means and is adjustably mounted to move in and out to obstruct the air flow.

7. Automatic volume control means for radio receiving apparatus mounted in mobile vehicles as defined in claim 1 in which the resistance means consists of a plurality of thermistor units connected in parallel in the circuit and in which there is provided means to vary the flow in the tubular mounting means which consists of a member which projects into the tubular means and is adjustably mounted to move in and out to obstruct the air flow.

References Cited

UNITED STATES PATENTS 3,233,109   2/1966   Byles et al.

WILLIAM C. COOPER, *Primary Examiner.*

W. A. HELVESTINE, *Assistant Examiner.*

U.S. Cl. X.R.

179—1; 325—312